INVENTOR.
RALPH C. IMMEL 3,114,395
VALVED BRIDGING PLUG AND METHOD
Ralph C. Immel, 5530 Palomar Lane, Dallas, Tex.
Filed Nov. 25, 1960, Ser. No. 71,628
4 Claims. (Cl. 138—97)

My invention relates to the art of repairing leaking sections of pipelines without taking the pipelines out of service, and more particularly relates to an improved method and apparatus for repairing the pipeline by replacing a damaged portion thereof.

It is a principal object of my invention to provide an improved method and apparatus for internally bridging a fault in a pipeline between two stations in the line whereby the faulty portion of the line can be cut out and replaced without disrupting flow of fluid in the line or substantial loss of fluid.

Another important object of my invention is to provide adequate line sealing and leak bridging means which seal the line, when a portion thereof has been cut away, so tightly that it is safe to weld the new portion of the line in place even though the line is carrying a combustible fluid.

Still a further object of the invention is to provide a structure which stops a line-bridging plug in the position necessary to close the leak and which can be manipulated from outside the line at a position adjacent to the repaired portion to permit the plug to move on past the repaired portion to be removed from the line at the next station thereof.

Other objects and advantages of the invention will become apparent during the following discussion of the drawing, wherein.

Figure 1:
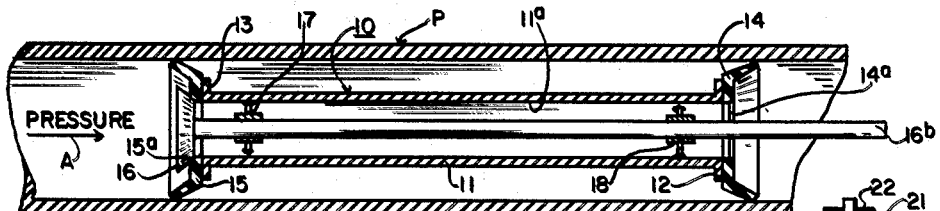
FIG. 1 is a sectional view through a pipeline illustrating a valved leak-bridging plug according to the invention and being propelled to the right by fluid pressure within the line.

Referring now to the drawing, FIG. 1 shows a section of pipeline P filled with a fluid which is pressurized and flowing in the direction of the arrow A. Within the pipeline P is a valved bridging plug 10 according to the invention, the plug comprising a central tubing section 11 having flanges 12 and 13 respectively located at its two ends. These flanges support and are bonded to resilient cups 14 and 15, the actual joint between the flanges and the cups being made in any satisfactory manner, there being a number of adequate joint structures disclosed in the prior art. These cups 14 and 15 are preferably made of a rubber-type material such as neoprene which is resistant to deterioration in the presence of petroleum base fluids.

Each of the cups has an opening therethrough registering with the bore 11a of the tubing 11, these openings 14a and 15a being chamfered to provide a valve seat capable of cooperating with the chamfered surface 16a of a valve 16 having an elongated stem 16b which passes through the bore 11a of the tubing and extends beyond the rubber cup at the other end of the bridging plug 10, the valve stem 16b being centered in the tubing bore 11a by several spacer bushings 17 and 18.

An additional structure comprising a boss 20 welded to the pipe P and a rod 25 extending therethrough into the pipe P is necessary to open the valve 16 when the bridging plug 10 arrives at the leak in the pipeline P just beyond the leak L and then a hole H is drilled through the pipeline and aligned with the axial bore of the boss which comprises the stationary portion of a packing gland which is threaded at 21. A packing nut 22 is screwed into the threaded boss and compresses packing material M around the rod 25 to render the joint leakproof.

The pressure in the pipeline P drives the bridging plug 10 in the direction of the arrow A while the valve 16 is seated on the seat 15a, FIG. 1, until the valve stem 16b strikes the rod 25 and arrests the forward motion of the valve 16. Inertia and/or fluid pressure carries the plug 10 further to the right until the seat 15a moves far enough beyond the valve surface 16a that the bore through the tubing 11 is opened sufficiently to by-pass the pressure differential which was propelling the plug through the pipe. Then the plug 10 stops in the position shown in FIG. 2.

Figure 2:
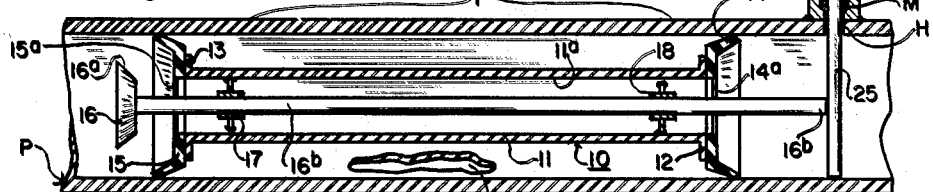
FIG. 2 is a sectional view similar to FIG. 1 but showing the bridging plug stopped in a position which bridges a leak in the line, the valve in the plug having been opened to stop the plug by by-passing the fluid pressure.
Figure 3:
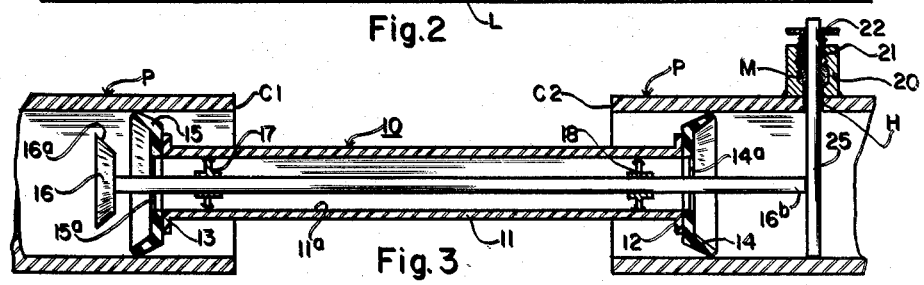
FIG. 3 is a sectional view similar to FIG. 2 but showing the pipeline after the faulty portion thereof has been cut away.
Figure 4:
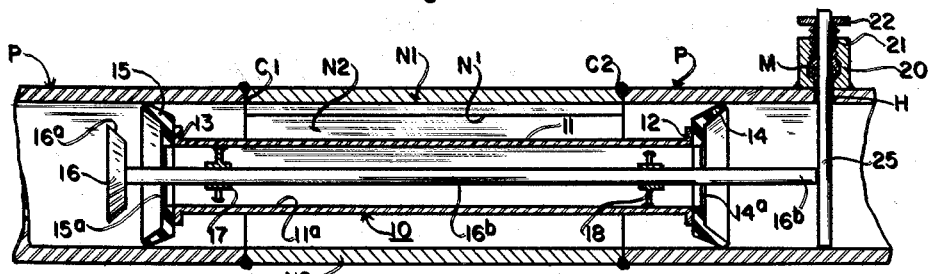
FIG. 4 is a sectional view similar to FIG. 3 but showing a new section of pipe installed to replace the leaking portion which was cut away.

Next, the faulty portion F of the pipeline including the leak L, FIG. 2, is cut away as shown in FIG. 3 along the lines C1 and C2, and a new portion of pipe is inserted and welded in place. For practical reasons the new pipe section will have to be divided longitudinally, for instance along the line N', FIG. 4, and inserted in at least two pieces N1 and N2 and then welded together.

After this step is completed, the rod 25 can be retracted out of the pipeline P, thereby releasing the valve stem 16b, and permitting the valve 16 to close. The pressure in the pipeline P will then propel the bridging plug 10 down the pipeline P, as shown in FIG. 1, until it reaches the next station of the pipeline where it can be readily removed in a manner well known per se.

Figure 5:
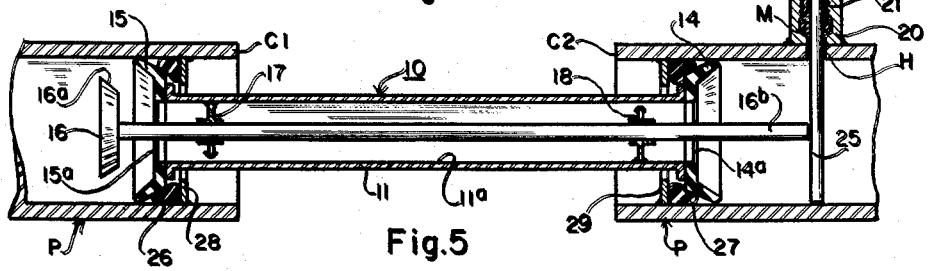
FIG. 5 is a sectional view of the pipeline similar to FIG. 3 but showing additional O-ring sealing means backing up the rubber cup members on the bridging plug and held in place by abutments welded in the pipeline.

Referring to FIG. 5, if an especially secure seal is desired, especially where the bridging plug is to be left in the pipeline P for some time before a new portion N1—N2 is welded in place, O-rings 26 and 27 can be inserted, preferably around the tubing 11 of the bridging plug before it is sent into the pipeline P, and these O-rings can be retained in place by insert rings 28 and 29 secured in place by any suitable means, such as by welding.

I do not limit my invention to the exact forms illustrated in the drawing, for obviously changes can be made in the details of the structure within the scope of the following claims.

I claim:
1. Apparatus for repairing a pipeline carrying fluid under pressure without interruption of fluid flow, comprising bridging plug means including a length of tubing of outer diameter smaller than the inside diameter of the pipeline and including resilient seal members attached to the tubing and of outer diameter sufficient to seal against the inside pipeline surface, the bridging plug means having a bore therethrough and having valve means in control of fluid flow in the bore; and valve actuating means attached to the pipeline near the faulty portion thereof for manipulating said valve means.

2. Apparatus for repairing a pipeline carrying fluid under pressure without interruption of fluid flow, comprising bridging plug means including a length of tubing of outer diameter smaller than the inside diameter of the pipeline and including resilient seal members attached to the tubing and of outer diameter sufficient to seal against the inside pipeline surface, the bridging plug means having a bore therethrough including a valve seat and having valve means normally pressed against the seat by said fluid pressure to close the bore; and valve actuating means attached to the pipeline near the faulty portion thereof for automatically unseating the valve means when the bridging plug means enters the faulty portion of pipeline.

3. In apparatus as set forth in claim 2, a stem contacting said valve means and extending outwardly ahead of the tubing, and said actuating means comprising an abutment introduced into the pipeline, the stem contacting the abutment and displacing the valve means from the seat to open the bore.

4. In apparatus as set forth in claim 3, stuffing box means attached to the pipeline just beyond said faulty portion; and said abutment comprising a rod introduced into the pipeline through said stuffing box means.

References Cited in the file of this patent
UNITED STATES PATENTS

| | | |
|---|---|---|
| 2,002,383 | Witt | May 21, 1935 |
| 2,500,601 | Butler | Mar. 14, 1950 |
| 2,510,513 | Mueller | June 6, 1950 |
| 2,743,034 | Wheatley | Apr. 24, 1956 |
| 2,829,675 | Mueller | Apr. 8, 1958 |